(12) United States Patent
McLeod

(10) Patent No.: US 7,252,043 B2
(45) Date of Patent: Aug. 7, 2007

(54) APPARATUS FOR APPLICATION OF LIQUIDS OR LIQUID-SOLID DISPERSIONS TO SOIL, AND A KIT TO ADAPT SOIL AERATION OR TILLAGE DEVICES TO FURTHER SUPPLY LIQUIDS OR LIQUID-SOLID DISPERSIONS TO SOIL

(75) Inventor: Robert Archie McLeod, Woodstock (CA)

(73) Assignee: Holland Equipment Limited, Norwich, Ontario (CA)

( * ) Notice: Subject to any disclaimer, the term of this patent is extended or adjusted under 35 U.S.C. 154(b) by 281 days.

(21) Appl. No.: 10/926,971

(22) Filed: Aug. 27, 2004

(65) Prior Publication Data

US 2006/0042526 A1 Mar. 2, 2006

(30) Foreign Application Priority Data

Aug. 20, 2004 (CA) .................................... 2478284

(51) Int. Cl.
*A01C 23/00* (2006.01)
(52) U.S. Cl. ...................................... 111/121; 111/903
(58) Field of Classification Search ........ 111/118–129, 111/903; 239/146–176, 722, 754
See application file for complete search history.

(56) References Cited

OTHER PUBLICATIONS

Balzer Inc.—copy of brochure (1 page) and copy of order form (1 page), date unknown.

Aerway—copy of brochure (1 page), date unknown.

*Primary Examiner*—Christopher J. Novosad
(74) *Attorney, Agent, or Firm*—Gowling Lafleur Henders LLP; D. Doak Horne

(57) ABSTRACT

An apparatus for application of a liquid or liquid-solid dispersion to soil, which is adapted when towed over soil to apply such liquid-solid dispersion to the soil. A supply conduit, having a distal end and a proximal end is provided. The distal end thereof is adapted to be releasibly coupled and in fluid communication with a source of liquid-solid solution, such as liquid manure. The supply conduit is pivotally coupled, via a pivot member, to the frame of the implement to permit the supply conduit to be pivoted in a substantially horizontal plane. The pivot member is coupled at one end thereof to the supply conduit at a location intermediate the distal end and the proximal end of such supply conduit, and is pivotally coupled at an opposite end to the frame of the apparatus. A manifold portion, having a plurality of manifolds thereon, is provided. A corresponding plurality of flexible tube members, in fluid communication with a respective manifold member, are further proided to permit delivery of the liquid-solid dispersion to various areas of the apparatus for subsequent delivery to the soil. A kit comprising the supply conduit and attached pivot member are also described, such kit adapted to permit conversion of an existing soil tillage or soil aeration apparatus to an apparatus that further provides for delivery of liquid-solid dispersions, such as liquid fertilizer, or liquid manure, to the soil.

21 Claims, 5 Drawing Sheets

APPARATUS FOR APPLICATION OF LIQUIDS OR LIQUID-SOLID DISPERSIONS TO SOIL, AND A KIT TO ADAPT SOIL AERATION OR TILLAGE DEVICES TO FURTHER SUPPLY LIQUIDS OR LIQUID-SOLID DISPERSIONS TO SOIL

FIELD OF THE INVENTION

This invention relates to farm equipment, and in particular to an apparatus for applying liquids or liquid-solid dispersions, such as liquid manure, to soil, as well as a kit for adapting soil aeration and tillage devices to further supply said liquids or liquid-solid dispersions to soil.

BACKGROUND OF THE INVENTION AND DESCRIPTION OF THE PRIOR ART

Liquid manure is a valuable source of nutrients for agricultural crops. Other nutrient streams, typically liquid or liquid-solid dispersion, may include effluent from food processing plants, municipal bio-solids from sewage treatment plants, or commercially-available liquid fertilizers.

In the case of prior art implements and methods of applying liquid manure to tracts of land, a dragline system provides an economical method for delivering the slurry.

One manner of delivery to a crop is to pump the slurry, typically a liquid-solid dispersion, from a lagoon or storage tank to the field by a piping system, where it is delivered to an application implement via a flexible dragline. In the field a flexible dragline is coupled to an application implement, and the implement is pulled across the field by a tractor.

The implement may spread the slurry in a broadcast manner on the surface of the soil, may precision apply the slurry in bands located in the cultivation path of the implement or rows of live crop; or alternatively may blend or bury the material in the soil.

The tractor, which tows the application implement, due to flexibility of the dragline, can follow a serpentine path in the field to give uniform coverage of the land while being operatively connected to the flexible dragline.

Typically, with respect to prior art devices which are used in this manner and which have capability of being operatively coupled to a flexible dragline, on the towed application implement a swing pipe (invariably a horizontal conduit extending rearwardly of the towed implement) is provided; one end of which is pivotally connected to the implement ; the other connects to the dragline, which is in turn operatively connected to the liquid-solid dispersion distribution system. The swing pipe transmits the forces required to pull the dragline, conduct the slurry to the implement for delivery to the soil, and provides clearance with the structure of the implement when the tractor makes turns in the field.

A number of soil tillage or soil aeration devices, typically towed by a tractor or other commercial farming vehicle, are currently on the market and are commercially available, which simultaneously permit such tillage or aeration device to further at the same time as the soil is being tilled or aerated supply a liquid or liquid-solid dispersion, such as liquid fertilizer or liquid manure, to the soil, while being coupled to the dragline.

Advantageously, such modified tillage/aeration devices have the advantage to farmers in that they permit a farmer avoiding having to fertilize the soil in a separate operation than the tillage/aeration operation, and thus avoid the attendant additional expense to farmers in gas/diesel of such additional operations, as well as the additional time and manpower required to conduct separate operations.

Such implements, typically for the supply of liquid manure, consist of a typical tillage or aeration device adapted to be towed by a tractor having a plurality of gangs of disks, harrows, or spiked rollers to either till, plough, or aerate, respectively, the soil, further having a supply conduit and a plurality of lesser diameter flexible tubes which permit liquid manure to be supplied to the device and thereafter to the soil, respectively. The application by the device of the liquid manure to the soil occurs typically immediately after the soil has been tilled or ploughed, but sometimes occurs immediately in advance of a gang of harrows, knife members, or spiked rollers, which thereafter proceed to mix the manure into the soil.

A generally horizontal elongated conduit extends rearwardly of the device, and is adapted at a distal end thereof to be coupled to a source of liquid manure, which may be contained in a large tank which is further towed by the tractor rearwardly of the tillage/aeration device, or alternatively may be coupled by way of a lengthy flexible hose (a "drag hose") to a stationary tank or lagoon, to permit supply of liquid manure to the device.

One such commercially-available device is a soil tillage and liquid manure applicator sold by Balzer Inc, of Mountain Lake, Minn.

Another device is an AERWAY™ soil aerating and manure applicator device manufactured by the applicant herein, namely Holland Equipment Limited of Norwich, Ontario, Canada.

These devices each possess an elongate, substantially horizontal, rearwardly extending conduit to supply liquid manure to the device, and thereafter to the soil. Such horizontal conduit is pivotally coupled to a vertically-extending conduit, which extends upwardly therefrom at approximately a 90° angle, and further swivels so as to permit the horizontal conduit to pivot in a substantially horizontal plane about a vertical axis passing through such vertically-extending conduit.

Pivoting of the horizontal supply conduit in a horizontal plane is useful as it avoids having to disconnect and connect the supply conduit to the source of liquid manure each time the farmer reverses direction when towing the tillage device around tracts of land. Alternatively, when various tanks containing liquid manure are also towed by the tractor and serve as a mobile supply of liquid manure, pivotable movement of the supply conduit is advantageous as it permits adaption to various tanks which may have their supply connections located in different positions, thereby permitting a single aeration/tillage device to be compatible with and coupleable to various tanks having different geometries.

Importantly, disadvantages of the prior art configuration are that additional equipment such as a flow meter and/or shut-off valve, when as in the prior art such are mounted on the horizontal conduit (which is itself mounted on the frame of the implement), are subject to forces imposed by the drag line on the horizontal conduit, and thence to the vertically-extending conduit, which means such additional equipment must typically be made more robust than otherwise would be the case in order to avoid bending, breakage, or deformation leading to leakage or inoperability of such optional equipment.

Prior art devices having vertically-extending conduits directly mounted to the frame and which swivel present challenges in that the vertical conduit must transmit force loads and maintain a secure seal for the liquid-solid dispersions. Such swivel construction has disadvantages in the form of substantial hardware costs, potential leaks, and difficulty of maintenance.

In addition, some vertically-extending conduits which are caused to rotate due to the pivoting of the horizontal supply conduit to which they are attached, tend to wrap the flexible delivery tubes to which they are attached, around them when the horizontal supply conduit is caused to pivot. The foregoing occurrence tends to limit the extent to which the horizontal conduit may be pivoted. Alternatively, or in addition, when a vertically-extending conduit is provided that swivels, and the horizontal supply conduit is pivoted such may, particularly where large (wide) implements are used and accordingly there are many flexible supply tubes to supply liquid manure across the swath of the device, place kinks in some of the flexible tubes which supply liquid manure to the soil, and/or cause uneven stretching or wear in some of the flexible tubes, thereby limiting the effectiveness of these devices.

Accordingly, a real need exists for an apparatus for applying liquid-solid dispersions to soil, having a horizontal supply conduit which pivots in a horizontal plane to provide the above advantages, but which at the same time is simple and cost effective to manufacture and maintains good sealing and in addition overcomes certain of the disadvantages of the prior art such as placing of additional stresses on measuring and valving equipment which may be included.

SUMMARY OF THE INVENTION

In order to overcome some of the disadvantages of the prior art, the present invention in a broad aspect thereof provides for an apparatus for application of liquid and liquid solid solutions to soil, having a reconfiguration over the prior art of the both manner in which the horizontal supply conduit is configured and supported by the towed implement, and further in the manner in which it is pivotally coupled to such implement.

In a further broad embodiment of the invention, the present invention provides a kit for adapting an existing soil tillage or soil aerating device to further be able to supply a liquid-solid dispersion to soil which is being aerated or tilled.

Accordingly, in a first broad embodiment, the present invention comprises an apparatus for application of a liquid or liquid-solid solution to soil. Frame means, adapted for releasable connection to a powered vehicle to permit passage of such apparatus over soil, is provided. Further provided are conduit means, having a distal end and a proximal end, adapted at said distal end to be releasably coupled and in fluid communication with a source of said liquid or liquid-solid solution, pivotably coupled to said frame means so as to permit pivotable movement thereof in a substantially horizontal plane about a vertical axis extending proximate said proximal end of said conduit means. A conduit member portion is provided at said proximal end of said conduit means having extending outwardly therefrom and in fluid communication therewith a plurality of manifold members; and, a plurality of flexible tube members, in fluid communication respectively with each of said manifold members and extending outwardly therefrom, are further provided. Each of said tube members are adapted to permit delivery of said liquid or liquid-solid solution from said manifold members to said soil.

Advantageously, such apparatus may provide the function of delivering such liquids and liquid-solid dispersions to the soil, or alternatively may further have the ability to combine such operation with an additional soil tillage or soil aeration operation to assist in mixing the liquid-solid dispersion such as liquid manure with the soil.

In a preferred embodiment of the above aspect of the invention, said conduit means is pivotally coupled to said frame means via a pivot member, said pivot member coupled to said conduit means at a location intermediate said proximal end of the conduit means and the conduit member portion thereof.

The manifold member portion may be either vertical, or horizontal.

The apparatus of the present invention may incorporate optional devices which are typically used with such apparatus, such as a manual valve or automatic control valve, such as a solenoid-actuated control valve, which is used to open and close and/or regulate the supply of liquid-solid dispersion from the supply conduit to the conduit member portion thereof. In particular, the flow of liquid-solid dispersion. The flow may be regulated I (ie.fully open or fully closed, or in an intermediate position of not fully open but not fully closed) in order to apply the manure at a variable rate depending on conditions.

A flow meter may also be incorporated. Advantageously, the configuration of the apparatus of the present invention permits such optional devices to be located in a position where they are not subject to forces exerted by a drag line to which the supply conduit may be coupled.

Advantageously, the configuration of the present invention, where the optional equipment such as valves and flow meters are located in such conduit means intermediate (1) the point of attachment of the pivot member to the conduit means and (2) the conduit member portion, avoids any forces being transmitted to such optional equipment by the drag line, thereby meaning these optional types of equipment, such as valves and flow meters, need not be reinforced to withstand such forces.

Accordingly, in a preferred embodiment of the present invention to an apparatus for applying liquids or liquid-solid dispersions to soil, where either a valve means or flow measurement means is utilized, each of the valve means and/or flow meter is positioned in said conduit means intermediate a point of said coupling of said pivot member to said conduit means, and said conduit member portion.

In a further embodiment of the apparatus of the present invention, there is provided an apparatus for combined application of a liquid or liquid-solid solution to soil as well as tillage or aeration of said soil, comprising:

frame means, adapted for releasable connection to a vehicle to permit passage of such apparatus over soil;

conduit means, having a distal end and a proximal end, adapted at said distal end to be releasibly coupled and in fluid communication with a source of said liquid or liquid-solid solution, pivotably coupled to said frame means via a pivot member, said pivot member coupled to said conduit means at a location intermediate said proximal end and said distal end so as to permit pivotable movement of said conduit about a vertical axis, a conduit member portion at said proximal end of said conduit means having extending outwardly therefrom and in fluid communication therewith a plurality of manifold members, adapted for pivotal rotation about said vertical axis; and a plurality of flexible tube members, in fluid communication respectively with each of said manifold members and extending outwardly therefrom, each adapted to permit delivery of said liquid or liquid-solid solution to said soil.

In yet a further aspect of the invention, a kit is provided which allows an existing implement for soil tillage or for soil aeration, to be adapted to further deliver liquid or liquid-solid solutions containing plant nutrients to the soil.

Accordingly, in accordance with such aspect, a kit is provided, which is adapted to be coupled to a soil tillage or soil aeration device to further adapt said device to apply liquid-solid dispersions to soil being aerated or tilled. Such kit comprises elongate conduit means, having a distal end and a proximal end, having coupling proximate a distal end thereof to permit connection to a source of supply of a liquid-solid dispersion, said conduit means further comprising:

i) a manifold portion situated proximate said proximal end, having extending outwardly therefrom and for fluid communication therewith a plurality of manifold members;

ii) a pivot member, extending substantially horizontally and fixedly attached to said conduit means intermediate said conduit member portion and said distal end, adapted for pivotable coupling to said tillage or soil aeration device so as to permit said proximal end of said conduit means to pivot in a substantially horizontal plane about a substantially vertical axis.

A plurality of flexible tube members, adapted for physical connection respectively to said manifold members, are further provided as part of the kit to permit delivery of said liquid-solid dispersion to soil.

Again, the manifold member portion of the kit of the present invention may be either horizontal or vertical.

The pivot member providing support to the horizontal supply conduit is affixed thereto at a point intermediate the proximal and distal ends of such supply conduit. Because of the pivot member providing support and transmitting forces from the point of attachment to the supply conduit directly to the frame of the device to which the pivot member is then coupled, additional equipment such as valves and flow measurement devices may be situate in such conduit means at a location (namely on a side of such point of attachment of such pivot member to the conduit means opposite the distal end to which a drag line is attached) which allows avoidance of any of the forces exerted by the drag line on the conduit means being transmitted to such additional equipment.

BRIEF DESCRIPTION OF THE DRAWINGS

Further advantages and permutations will appear from the following detailed description of various non-limiting embodiments of the invention, taken together with the accompanying drawings, in which.

DETAILED DESCRIPTION OF SOME PREFERRED EMBODIMENTS

Figure 1:
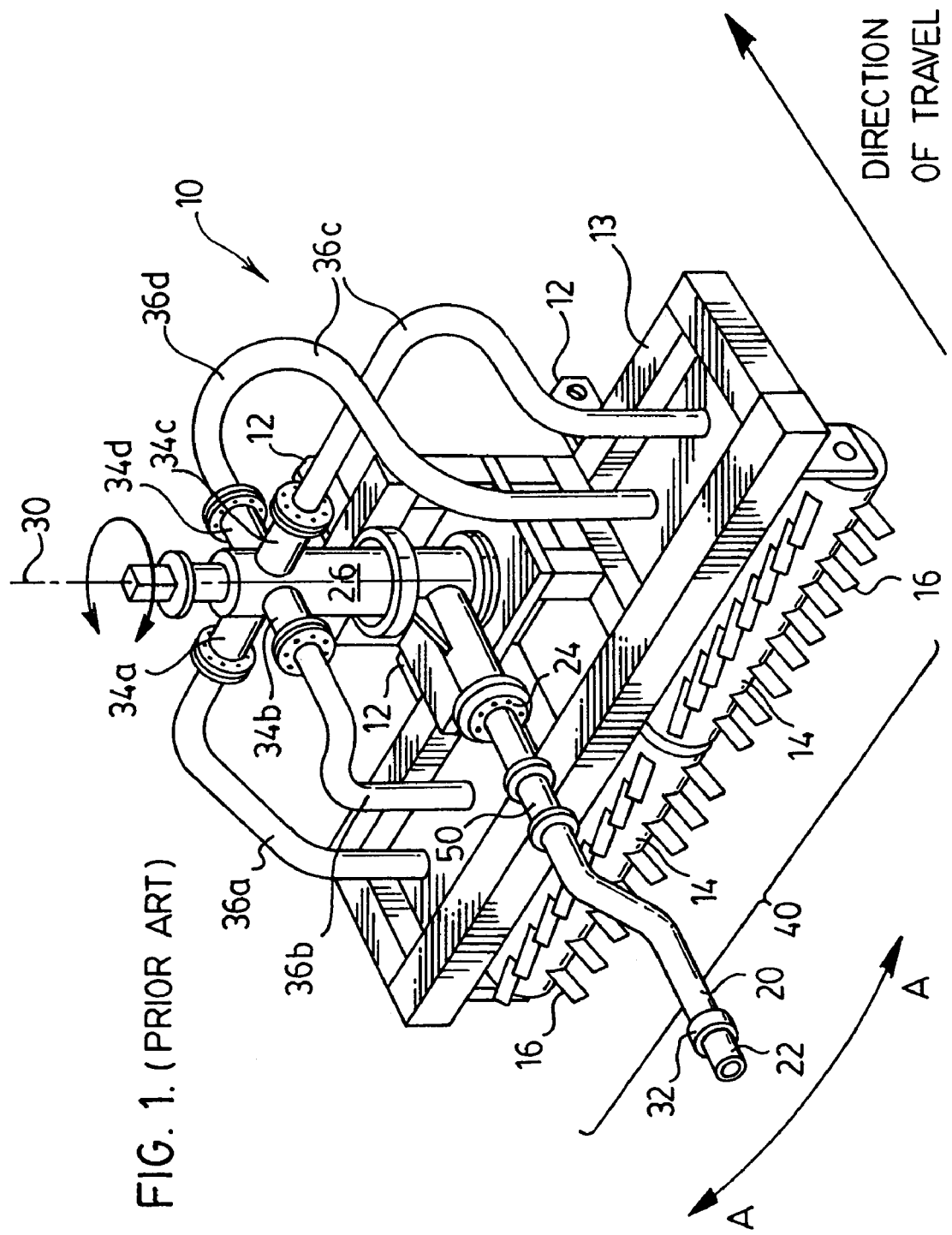
FIG. 1 is a perspective view of a prior art aeration and liquid manure application device which may be towed by a tractor and in particular is adapted to attachment on a three-point hitch of a tractor, which utilizes a vertical-extending conduit.

In all figures, for consistency, identical components are identified with identical reference numerals.

FIG. 1 shows a prior art apparatus 10 for the simultaneous aeration of soil as well as the application of liquid manure to the soil.

Prior art apparatus 10 shown in FIG. 1 depicts a prior art aeration device further adapted to apply liquid manure to the soil at the same time as the soil is being aerated by the prior art apparatus 10.

Prior art apparatus 10 possesses a frame 13. Three hard-point attachments 12 are mounted on frame 13 for attachment of the apparatus 10 to a three-point hitch of a tractor (not shown) used to tow such apparatus 10. However, other conventional hardware for towing agricultural implements such as the apparatus shown in FIG. 1, such as tow bars (not shown), are also used.

The prior art apparatus 10 shown in FIG. 1 is specifically adapted, when towed by a tractor, to aerate soil by means of a number of gangs of tined rollers 14, each having a plurality of radially outwardly extending tines 16 thereon, which are used to pierce and shatter the soil to thereby aerate it when such tined rollers 16 of apparatus 10 are towed over soil.

Prior art apparatus 10 is further adapted to permit supply of liquid manure to soil, which may be supplied to such apparatus 10 by way of a flexible drag-line 11 (not shown in FIG. 1—see FIGS. 2 and 5) which is detachably coupled to supply conduit 20 at a distal end 22 thereof.

In this regard, supply conduit 20 is coupled at its proximal end 24 to a vertically-extending conduit member 26, which extends vertically upwardly from supply conduit 20, and is in fluid communication with supply conduit 20. Vertically-extending conduit member 26 is pivotable about a vertical axis 30, to permit angular pivotable movement of supply conduit 20 in the direction shown by arrows "A". Pivotable movement of supply conduit 20 in the direction of supply arrows "A" assists in preventing drag line 11 (not shown in FIG. 1—see FIGS. 2 and 5) to which supply conduit 20 is releasably coupled via a conventional fluid coupling 32 from kinking as apparatus 10 is towed back and forth over a field by a tractor (not shown).

Forming a part of vertically-extending conduit member 26 are manifold members 34a, b, c, d, which extend radially outwardly therefrom.

Coupled in fluid communication to manifold members 3a,b,c,d are respective flexible tube members 36a, b, c, d, which permit liquid manure to be delivered from conduit member 26 to various points along the extent of forward swath 40 of prior art apparatus 10. Flexible tube members

36*a, b, c, d,* are flexible to permit pivoting of vertically-extending conduit member 26 about vertical axis 30.

Flexible tube members 36*a,b,c,d,* are typically of a non-water permeable and flexible material, resilient to deterioration under sunlight conditions. Only four (4) tubes 36*a-d* are shown; however where swath 40 of apparatus 10 is of substantially greater width than shown, additional manifold members 34*a-d* in addition to those shown are provided, with a corresponding increase in the number of flexible tube members 34*a-d* provided so as to provide uniform supply of liquid manure to the soil across the expanse of the swath 40 of prior art apparatus 10.

A flow meter 50 may be provided, to measure flow rate of liquid manure being supplied by apparatus 10. Flow meter 50, in the position shown in FIG. 1, will be exposed to bending stresses applied to supply conduit 20 by the drag line 11 coupled to distal end 22 of supply conduit 20 as the drag line and apparatus 10 is towed by a tractor (not shown) across a field.

In the embodiment of the prior art apparatus 10 shown in FIG. 1, the apparatus 10 travels in the direction of travel shown. Accordingly, in the prior art apparatus 10 shown in FIG. 1, liquid manure is supplied to the soil via flexible tube members 36*a-d* in advance of tined aeration rollers 14. However, in conventional tillage machines of the prior art, where discs are utilized to till the soil, such prior art devices such as the apparatus 10 shown in FIG. 1 would typically have the liquid manure delivered via flexible tube members 36*a-d* immediately behind such discs (not shown), so that soil thereafter flows over such liquid manure, thereby reducing evaporation and smell, and ensuring the liquid manure is delivered to the soil in a region proximate the region in which seeds will be planted so that the planted seeds will thereby be best able to make use of such nutrients.

Figure 2:
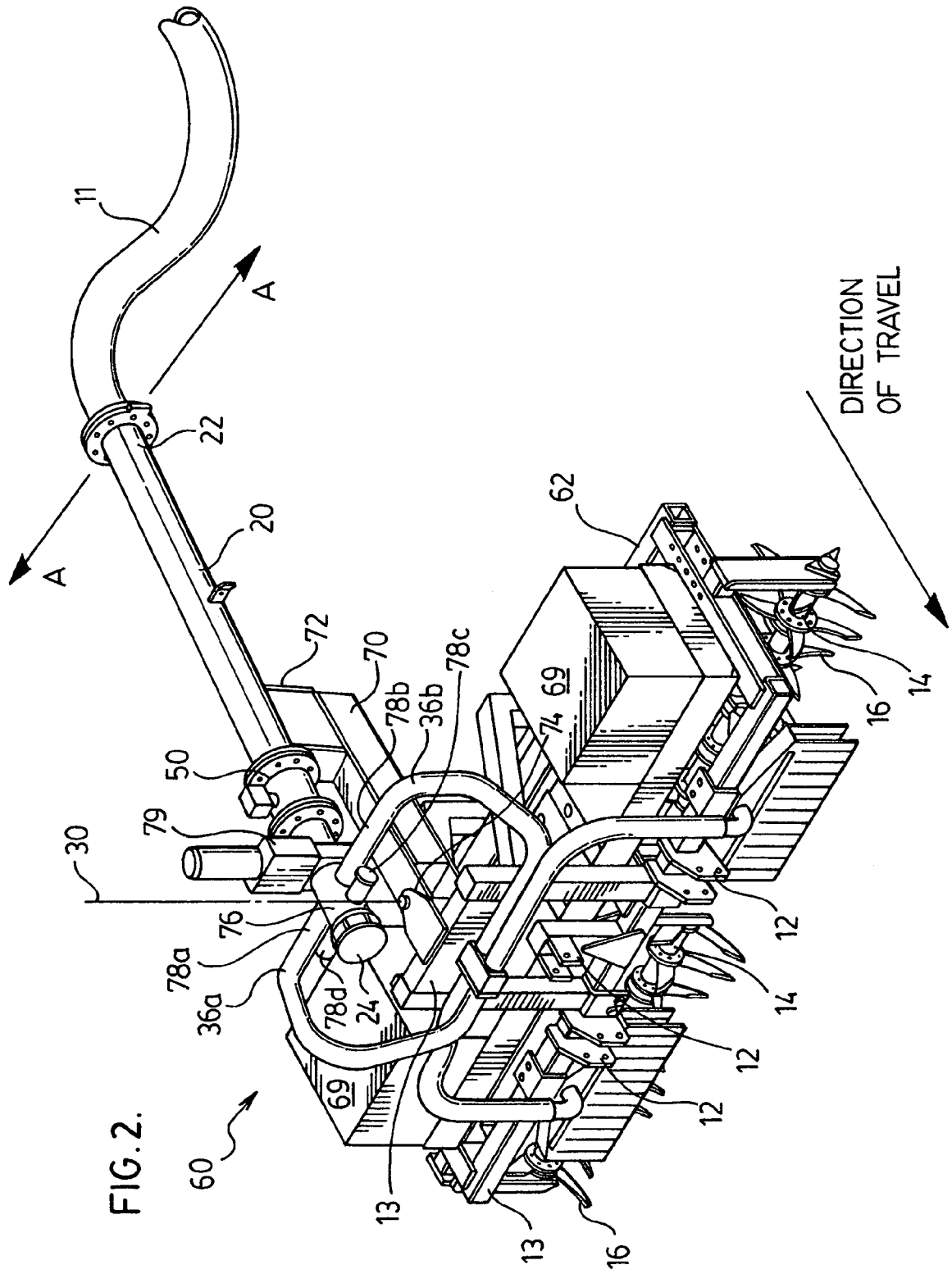
FIG. 2 is a perspective view of one preferred embodiment of the invention, showing a device for combined aeration of soil as well as application of liquid manure to the soil, having a pivotable horizontal conduit coupled to a pivot member which is pivotably coupled to the frame of the device, and a substantially horizontal conduit member portion, wherein the horizontal conduit is adapted to pivot via said pivot member about a vertical axis.

FIG. 2 shows an apparatus 60 of the present invention, namely an aeration device 62 adapted to be towed by a tractor (not shown) over soil desired to be aerated, in the direction of travel shown.

Aeration device 62 possesses a frame 13, adapted for releasable connection to a towing vehicle such as a tractor to permit passage of such apparatus over soil. In a preferred embodiment a plurality of hardpoint attachments 12 are mounted on frame 13 to permit attachment of device 62 to a three-point hitch of a tractor or other powered vehicle (not shown) for providing the means of propulsion for apparatus 62. Other conventional hardware for towing agricultural implements such as device 62, such as tow bars (not shown) may also or in the alternative be provided.

Two gangs of tined rollers 14, each having a plurality of radially outwardly extending tines 16 thereon, are provided. Such tines 16 are used to pierce and shatter the soil, to thereby aerate the soil. A typical apparatus which may be modified to possess the features of the present invention is an apparatus as shown in U.S. Pat. No. 4,840,232, to the assignee of the present invention Holland Equipment Ltd.

Such apparatus 60, in addition to having a plurality of tined rollers 14, typically has added masses 69, typically of cast concrete, to provide a downward force to ensure penetration of the tines 16 of the rollers 14 as the apparatus 60 is towed over the soil. Alternatively, tractor-powered hydraulically actuated means (not shown) may be provided to distribute a portion of the towing vehicle (such a a tractor's) weight on the implement to provide such downward force on rollers 14.

Insofar as the device has been adapted in accordance with this invention, there is provided conduit means, namely a supply conduit 20, having a distal end 22, to which a flexible drag-line 11 may fluidly coupled by means of a fluid coupling 23, as well as proximal end 24. Drag-line 11 provides a source of liquid or liquid-solid solution to apparatus 60. Supply conduit 20 is pivotably coupled to frame 13, by means of an intermediary pivot member 70, so as to permit pivotable movement of supply conduit 20 in the direction of arrows "A" of FIG. 2, namely in a substantially horizontal plane about vertical axis 30 extending proximate proximal end 24 of supply conduit 20.

Pivot member 70 is coupled at one end 72 thereof to supply conduit 20 at a location intermediate proximal end 24 and distal end 22 of said conduit 20, and pivotably coupled at an opposite end 74 to frame means 13.

A manifold portion 76 is located at proximal end 24 of supply conduit 20, aligned substantially on said vertical axis 30 and adapted to rotate in a horizontal plane about said vertical axis 30, in the direction shown in arrows "A". Such manifold portion 76 acts as a manifold to distribute various streams of liquid or liquid-solid dispersions to various areas of apparatus 60 for subsequent delivery to the soil.

In FIG. 2, manifold portion 76 has four manifolds 78*a*, 78*b*, 78*c*, 78*d* which extend radially outwardly therefrom, but more manifolds may be provided, particularly for larger sized apparatus 60 which have more numerous rollers 14, or gangs of rollers 14, to which liquid-solid dispersions are desired to be delivered to.

In FIG. 2, two flexible tube members 36*a*, 36*b* are provided, each in fluid communication with a respective manifold 78*a*, 78*b*, to permit liquid-solid dispersions such as liquid manure or liquid fertilizers to be distributed to various areas of the apparatus 60 for subsequent delivery to the soil. Tube members 36*a*, 36*b* are flexible, so as to permit flexation upon rotation of manifold portion 76 about axis 30, upon pivotable movement of supply conduit 20 coupled to drag-line 11 (or alternatively to a towed supply of liquid-solid dispersion) as apparatus 60 is towed about a tract of land.

Flexible tube members 36*a*, 36*b*, may be of any water-impermeable flexible material, preferably resistant to degredation under sunlight; and capable of withstanding fluid pressures typically in the range of up to 100 pounds per square inch.

Additional equipment, such as valve means 79, in the form of a solenoid-activated knife-valve 84, are provided to regulate when desired the flow of liquid-solid solution to apparatus 60, to permit the supply to be closed, for example during cleaning or when passing over an area of a tract of land where is not desired to apply a liquid-solid dispersion, such as on a roadway, for example.

Alternatively, or in addition, such valve means 79 may operate as a flow control means to regulate the quantum of liquid-solid dispersion flowing to apparatus 60.

Flow monitoring means 50, such as a rotameter or other flow sensing device capable of monitoring quantum of liquid or liquid-solid solution flowing through supply conduit 20, may also be provided.

Both valve means 79 and flow monitoring means 50 are advantageously provided on the proximal side of the point of attachment 90 of pivot member 70 to supply conduit 20, so that all forces transmitted by drag-line 11 to frame 13 are transmitted through pivot member 70 to frame 13, and not through either of valve means 79 or flow monitoring means 50.

Figure 3:
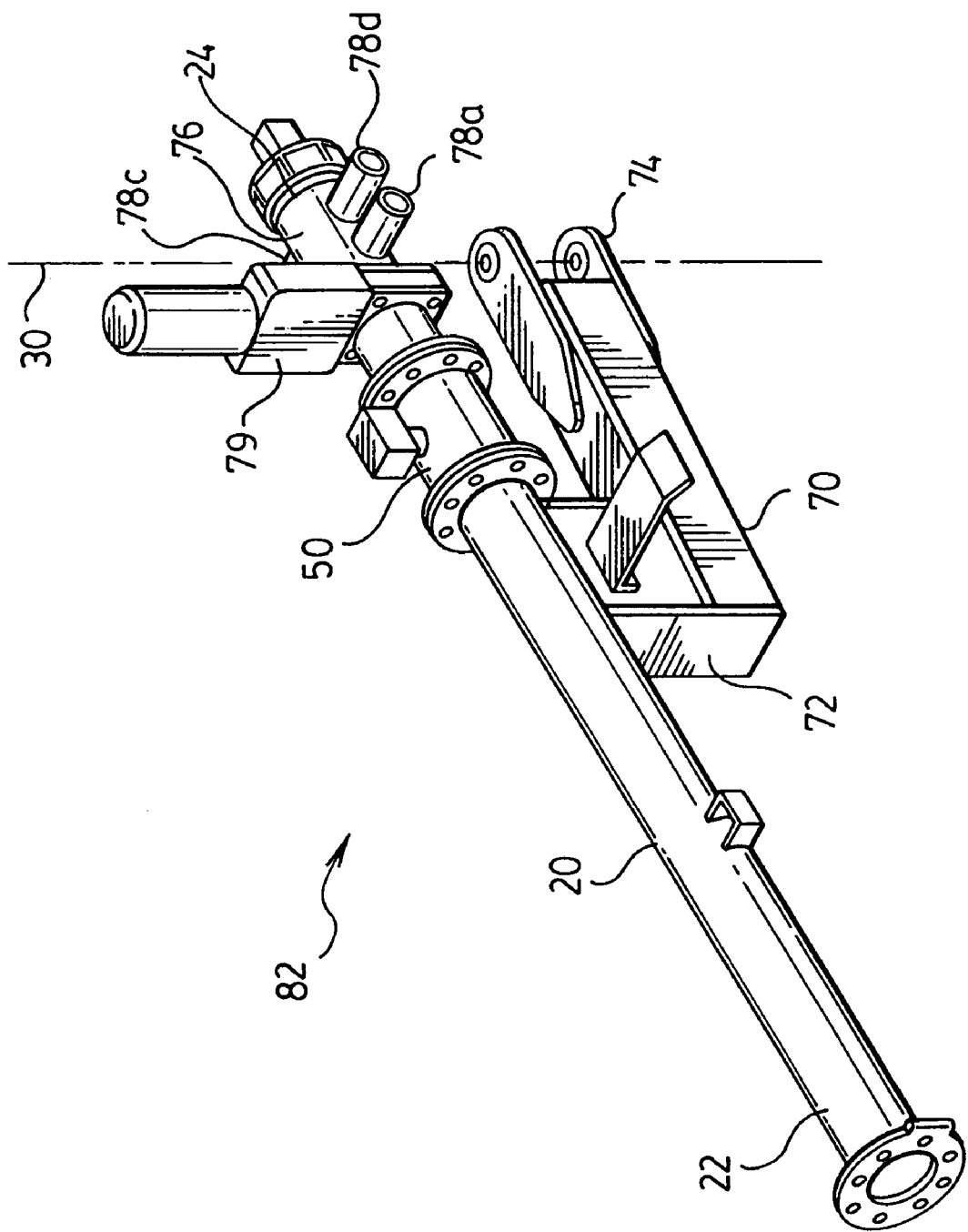
FIG. 3 is detailed exploded view of the kit of the present invention, showing the conduit means, the conduit member portion thereof, as well as the manifold members.

FIG. 3 shows a detailed view of the supply conduit 20, pivot member 70, flow monitoring means 50, valve means 79, and manifold portion 76 with manifolds 78*a*, 78*b*, 78*c*, 78*d* (with or without corresponding flexible tube members 36a, 36b (not shown in FIG. 3—see FIGS. 2 & 5), which may be provided in the form of a kit 82 to adapt a prior art tillage or aeration device 10, such as the aeration device shown in U.S. Pat. No. 4,840,232, to further supply a liquid solid solution to the soil at the same time as tillage or aeration of the soil is being carried out.

In the embodiment shown in FIG. 3, a simple threaded end-cap 92 is provided at the end of manifold portion 76, to block further flow of liquid-solid solution from manifold portion 76 other than through manifolds 36a, 36b. Such end cap 92 may be threadably removed to permit cleaning, which is particularly useful if supply conduit 20 or manifold portion 76 may become blocked.

Figure 4:
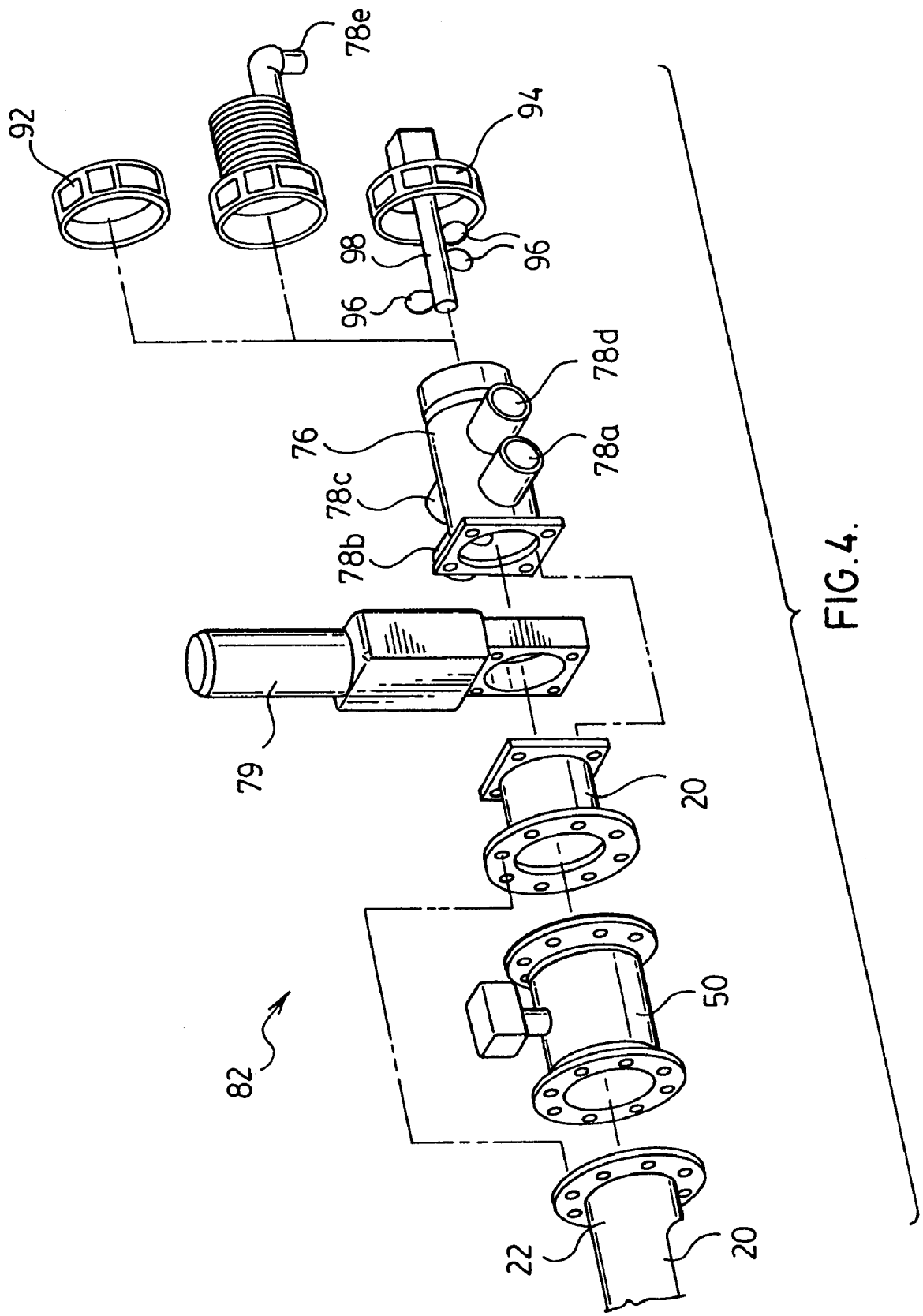
FIG. 4 is a detailed exploded view of the kit of the present invention, showing various optional attachments.

FIG. 4 shows an exploded view of the supply conduit 20 and associated components shown in FIG. 3 making up kit 82, showing three optional attachments for the distal end 22 of supply conduit 20, which may further be supplied as part of the kit 82.

In particular, in the alternative to a threaded end cap 92 as described above, a paddle device 94 may be substituted. Such paddle device 94 has a series of paddles 96 on a rotatable spindle means 98, which may be a single spindle or a plurality of co-axial spindles commensurate in number with the number of paddles 96, each spindle 98 operatively connected to a respective paddle 96. Paddles 96 become aligned with each individual manifold 78a, 78b when device 94 is threadable engaged with distal end 22 of supply conduit 20.

Rotatation of spindle means 98 and individual paddle members 96 thereon, allows quantum of flow of liquid or liquid-solid dispersion to be measured to each of the manifolds 78a, 78b, and also, or alternatively, particularly serves to direct more viscous solid-liquid dispersions into manifolds 78a, 78b by means of the rotation of each of paddle members 96. In addition, where a number of co-axial spindles 98 are used, the individual flow of solid-liquid dispersion into each manifold 78a, 78b may be individually measured by whether (and how quickly) the particular associated spindle 98 and attached paddle 96 rotate. This feature is particularly useful to determine whether liquid-solid dispersion is flowing evenly in each manifold 78a, 78b, 78c, 78d and thus being provided equally to various areas of apparatus 60.

Specifically, device 94 having paddles 96 on spindle 98 may be simply a hydraulically-powered member, receiving a supply of hydraulic power from the towing vehicle (not shown), and acts as a hydraulically-powered motor to turn paddles 96 on spindle 98, such paddles 96 being respectively aligned with manifold members 78a, 78b to thereby utilize paddles 96 to assist in pushing liquid-solid dispersion through each of respectively aligned manifold members 78a, 78b.

Alternatively, as shown in FIG. 4, a further alternative threaded attachment 99 may be provided, which possesses yet another manifold 78e. This attachment 99 may be provided where it is desired to increase the number of flexible tube members 80 and thus have manifolds 78a, 78b, 78c, 78d, and 78e for each of corresponding the flexible tube members 36a, 36b, 36c, 36d, and 36e (the latter flexible tube members 36c, 36d, and 36e not being shown).

Figure 5:
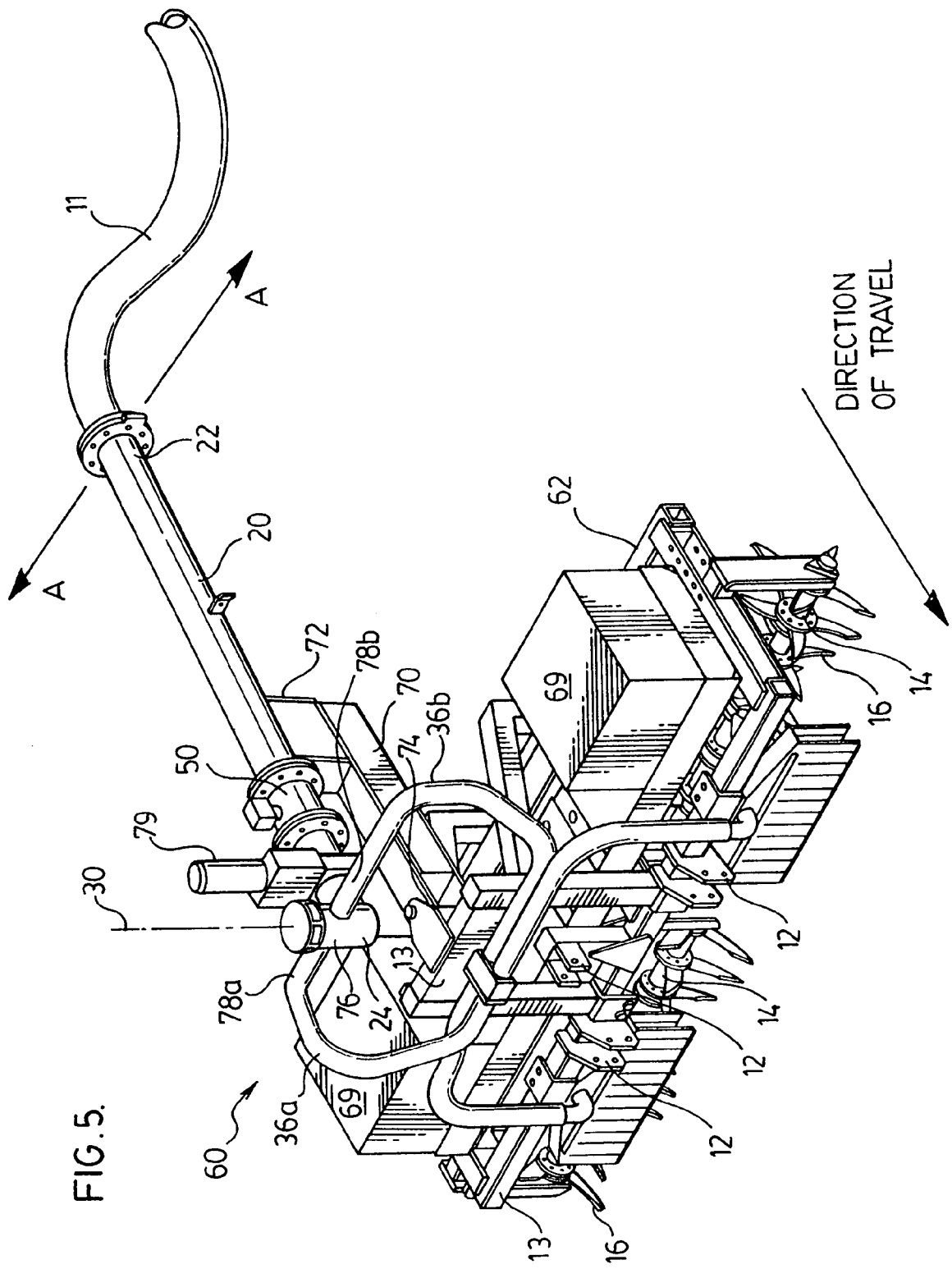
FIG. 5 is a perspective view of another embodiment of the invention showing a device for combined aeration of soil as well as application of liquid manure to the soil, having a pivotable horizontal conduit coupled to a pivot member which is pivotably coupled to the frame of the device, and a substantially vertical conduit member portion; wherein the horizontal conduit is adapted to pivot via said pivot member about a vertical axis.

FIG. 5 shows a slightly modified embodiment of the apparatus 60 shown in FIG. 2.

In the embodiment shown in FIG. 5, the manifold portion 76, while still situate at proximal end 24 of supply conduit 20, is aligned in a vertical manner along axis 30. While manifold portion 76 and manifolds 78a, 78b, 78c, and 78d thereon rotates about a vertical axis 30 similar to the prior art devices shown in FIG. 1, advantageously, by further providing a pivot member 70 coupled at one end to supply conduit 20 and at another pivotably coupled to frame 13, all forces (and thus material stresses) exerted due to drag-line 11 acting on supply conduit 20 are transmitted to frame 13 via pivot member 70, and are not exerted on flow meter 50 or valve means 79, thus allowing them to be of a less robust (and thus more inexpensive) design.

Although the disclosure described and illustrates preferred embodiments of the invention, it is to be understood that the invention is not limited to these particular embodiments. Many variations and modifications will now occur to those skilled in the art. For definition of the invention, reference is to be made to the appended claims.

I claim:

1. An apparatus for application of a liquid or liquid-solid solution to soil, comprising:
    frame means, adapted for releasable connection to a vehicle to permit passage of such apparatus over soil;
    conduit means, having a distal end and a proximal end, adapted at said distal end to be releasibly coupled and in fluid communication with a source of said liquid or liquid-solid solution, pivotably coupled to said frame means so as to permit pivotable movement thereof in a substantially horizontal plane about a vertical axis extending proximate said proximal end of said conduit means;
    a pivot member, said pivot member coupled at one end thereof to said conduit means at a location intermediate said proximal end and said distal end, and pivotably coupled at an opposite end thereof to said frame means;
    a manifold portion at said proximal end of said conduit means, aligned substantially along said vertical axis and adapted to rotate about said vertical axis; and
    a plurality of flexible tube members, in fluid communication respectively with said manifold portion and extending radially outwardly therefrom, each adapted to permit delivery of said liquid or liquid-solid solution to said soil.

2. The apparatus as claimed in claim 1, wherein said manifold portion is substantially horizontal.

3. The apparatus as claimed in claim 1, wherein said manifold portion is substantially vertical.

4. The apparatus as claimed in claim 1 further comprising valve means positioned along said conduit means intermediate said horizontal manifold portion and said distal end, to permit supply of said liquid or liquid-solid solution to said conduit means to be regulated.

5. The apparatus as claimed in claim 4, wherein said valve means is positioned in said conduit means intermediate a point of said coupling of said pivot member to said conduit means, and said manifold portion.

6. The apparatus as claimed in claim 1, said conduit means further comprising flow measurement means positioned intermediate said manifold portion and said distal end, adapted to measure quantum of said liquid or liquid-solid solution supplied to said soil.

7. The apparatus as claimed in claim 6, wherein said flow measurement means is positioned in said conduit means intermediate a point of said coupling of said pivot member to said conduit means, and said manifold portion.

8. An apparatus for application of liquid manure to soil, comprising:
    frame means, adapted for releasable connection to a vehicle to permit passage of such apparatus over soil;
    conduit means, having a distal end and a proximal end, adapted at said distal end to be releasibly coupled and in fluid communication with a source of said liquid manure, pivotably coupled to said frame means so as to permit pivotable movement thereof in a substantially horizontal plane about a vertical axis extending proximate said proximal end of said conduit means;

a substantially horizontal conduit member portion at said proximal end of said conduit means, having extending outwardly therefrom and in fluid communication therewith a plurality of manifold members; and a plurality of flexible tube members, in fluid communication respectively with each of said manifold members and extending outwardly therefrom, each adapted to permit delivery of said liquid manure to said soil.

9. The apparatus as claimed in claim 8, said conduit means pivotally coupled to said frame means via a pivot member, said pivot member coupled to said conduit means at a location intermediate said distal end and said conduit member portion.

10. The apparatus as claimed in claim 8 or 9, further comprising valve means positioned along said conduit means intermediate said conduit member portion and said distal end, to permit supply of said liquid manure to said conduit member portion to be regulated.

11. The apparatus as claimed in claim 8 or 9, said conduit means further comprising flow measurement means positioned intermediate said conduit member portion and said distal end, adapted to measure quantum of said liquid manure supplied to said soil.

12. A kit adapted to be coupled to a soil tillage or soil aeration device to further adapt said device to apply liquid-solid dispersions to soil being aerated or tilled, comprising:

elongate conduit means, having a distal end and a proximal end, having coupling proximate a distal end thereof to permit connection to a source of supply of a liquid-solid dispersion, said conduit means further comprising:

i) a conduit member portion situated proximate said proximal end, having extending outwardly therefrom and for fluid communication therewith a plurality of manifold members;

ii) a pivot member, extending substantially horizontally and fixedly attached to said conduit means intermediate said conduit member portion and said distal end, adapted for pivotable coupling to said tillage or soil aeration device so as to permit said proximal end of said conduit means to pivot in a substantially horizontal plane about a substantially vertical axis; and a plurality of flexible tube members, adapted for physical connection respectively to said manifold members, to permit delivery of said liquid-solid dispersion to soil.

13. The kit as claimed in claim 12, wherein said conduit member portion comprises a substantially horizontal manifold.

14. The kit as claimed in claim 12, wherein said conduit member portion comprises a substantially vertical manifold.

15. The kit as claimed in claim 12 further comprising valve means positioned along said conduit means intermediate said conduit member portion and said distal end, to permit supply of said liquid or liquid-solid solution to said conduit member portion to be regulated.

16. The kit as claimed in claim 15, wherein said valve means is positioned in said conduit means intermediate a point of said coupling of said pivot member to said conduit means, and said conduit member portion.

17. The kit as claimed in claim 12, wherein said conduit means further comprises flow measurement means positioned intermediate said conduit member portion and said distal end, adapted to measure quantum of said liquid or liquid-solid solution supplied to said soil.

18. The kit as claimed in claim 17, wherein said flow measurement means is positioned in said conduit means intermediate a point of said coupling of said pivot member to said conduit means, and said conduit member portion.

19. An apparatus for combined application of a liquid or liquid-solid solution to soil as well as tillage or aeration of said soil, comprising:

frame means, adapted for releasable connection to a vehicle to permit passage of such apparatus over soil;

conduit means, having a distal end and a proximal end, adapted at said distal end to be releasibly coupled and in fluid communication with a source of said liquid or liquid-solid solution, pivotably coupled to said frame means via a pivot member, said pivot member coupled to said conduit means at a location intermediate said proximal end and said distal end so as to permit pivotable movement of said conduit means in a substantially horizontal plane about a vertical axis;

a conduit member portion at said proximal end of said conduit means, having extending outwardly therefrom and in fluid communication therewith a plurality of manifold members, adapted for pivotal rotation about said vertical axis; and a plurality of flexible tube members, in fluid communication respectively with each of said manifold members and extending outwardly therefrom, each adapted to permit delivery of said liquid or liquid-solid solution to said soil.

20. The apparatus as claimed in claim 19, wherein said conduit member portion is a substantially horizontal manifold.

21. The apparatus as claimed in claim 19, wherein said conduit member portion is a substantially vertical manifold.

* * * * *